(12) United States Patent
Cessna et al.

(10) Patent No.: US 6,510,420 B1
(45) Date of Patent: Jan. 21, 2003

(54) FRAMEWORK FOR DYNAMIC HIERARCHICAL GROUPING AND CALCULATION BASED ON MULTIDIMENSIONAL MEMBER CHARACTERISTICS

(75) Inventors: Thao Vu Cessna, Middlesex, MA (US); Richard A. Morris, North Yorkshire (GB); Joseph Wissmann, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/409,345

(22) Filed: Sep. 30, 1999

(51) Int. Cl.⁷ .............................................. G06F 17/00
(52) U.S. Cl. ...................... 706/45; 707/102; 707/100; 707/3; 707/4
(58) Field of Search ..................... 706/45, 14, 925; 707/102, 100, 3, 4

(56) References Cited

U.S. PATENT DOCUMENTS

| | | | |
|---|---|---|---|
| 5,233,513 A | 8/1993 | Doyle | 705/7 |
| 5,572,644 A | 11/1996 | Liaw et al. | 707/31 |
| 5,680,619 A | 10/1997 | Gudmundson et al. | 717/1 |
| 5,721,910 A | 2/1998 | Unger et al. | 707/100 |
| 5,801,958 A | 9/1998 | Dangelo et al. | 716/18 |
| 5,819,270 A | 10/1998 | Malone et al. | 707/7 |
| 5,838,973 A | 11/1998 | Carpenter-Smith et al. | 717/1 |
| 5,870,746 A | 2/1999 | Knutson et al. | 707/101 |
| 5,907,704 A | 5/1999 | Gudmundson et al. | 717/1 |
| 6,122,628 A * | 9/2000 | Castelli | 707/5 |
| 6,205,447 B1 * | 3/2001 | Malloy | 707/102 |
| 6,301,579 B1 * | 10/2001 | Becker | 707/102 |

FOREIGN PATENT DOCUMENTS

JP          11025126 A          1/1999

OTHER PUBLICATIONS

J. L. Behm An Image for Visualization Dec. 1990 p. 1 Report Dkt. No.: KI990013.

* cited by examiner

*Primary Examiner*—Thomas Black
*Assistant Examiner*—Joseph P. Hirl
(74) *Attorney, Agent, or Firm*—John W. LaBatt

(57) ABSTRACT

A system and method for dynamically building hierarchical groupings of business information based on member characteristics. The system includes a computer program that comprises: (1) a mechanism for choosing one or more characteristic orderings (i.e., a hierarchical model), a characteristic set made up of N characteristics, and an initial set of members; (2) a mechanism for assigning characteristic values for each of the N characteristics for each of the initial set of members; (3) a mechanism for dynamically creating hierarchical levels and level to level relationships based on the chosen characteristic order; and (4) a mechanism for dynamically creating new members and member to member relationships in each of the hierarchical levels.

33 Claims, 7 Drawing Sheets

Characteristics

|  | A | B | C |
|---|---|---|---|
| $M_1$ | a | hot | 10.52 |
| $M_2$ | b | temperate | 5.87 |
| $M_3$ | b | hot | 12.87 |
| $M_4$ | a | cold | 6.98 |
| . | . | . | . |
| . | . | . | . |
| . | . | . | . |
|  |  |  |  |
| $M_N$ | a | hot | 8.45 |

MEMBERS

CharacteristicMap $\{$ ( -infinity , 7.5 ] --> x
( 7.5 , infinity ) --> y

FRAMEWORK FOR DYNAMIC HIERARCHICAL GROUPING AND CALCULATION BASED ON MULTIDIMENSIONAL MEMBER CHARACTERISTICS

BACKGROUND OF THE INVENTION

1. Technical Field

The present invention relates to computerized planning systems, and more specifically, to a framework for dynamically generating hierarchical groupings and relationships within a planning system.

2. Related Art

Merchandise planning systems have become an important tool for successful business planning. Proper merchandise planning allows a business to purchase the right levels of merchandise, in the right assortments, for the right stores. When done correctly, stores have balanced inventories and customers find the products they want. When done incorrectly, stores are faced with clearance markdowns, unhappy customers, and unbalanced inventories. Accordingly, accurate merchandise planning can be the difference between profitability and unprofitability.

Specialized software programs that handle planning data are now available to facilitate merchandise planning. Merchandise planning software programs allows users to create, monitor, evaluate and adjust merchandising plans. At the heart of such programs are spreadsheets that display and analyze data. During planning sessions, users can study and manipulate data to, for example, plan for business needs, create "what-if" scenarios, and analyze performance.

One of the problems faced by users, however, is managing the volume of data available to a business. This process often involves dealing with multidimensional data that, for example, includes different products (dresses, shirts, etc.), at different store locations (Boston, Chicago, etc.), at different periods of time (spring 2000, fall 2000, etc.). To approach a particular planning issue, a planner may desire to analyze an arbitrary view of the data with a predetermined granularity. This can be accomplished by viewing data at different levels of detail within a hierarchy. For instance, store locations could be viewed as individual stores, by district, or by region. Most planning software programs provide mechanisms for creating limited plan formats that select portions of the planning data for viewing, e.g., showing projected inventory requirements for all stores. However, the prior art does not provide mechanisms for dynamically creating hierarchical views of multidimensional data.

For instance, consider the planner that plans product inventory for stores within the business. The planner may recognize that certain stores share common attributes such as size, climate, and/or demographics. Accordingly, it may be useful to group or cluster certain stores together that share these attributes during the planning process in order to improve efficiency. However, because the planner may be dealing with multidimensional data, the manner in which stores are clustered together by the planner may depend on the particular product being planned. For example, for a particular product such as winter coats, it may be useful to group inventory needs for all cold weather stores together, while considering large stores separately from small stores. For other products, such as sneakers, the planner may not care about the climate or size of the stores, but instead want to group stores based on demographics.

Accordingly, even where the planner clusters stores having similar attributes, the resulting relationships may greatly depend upon the product. Thus, for example, a store may be "fashion forward" for sneakers, but "fashion following" for dresses. Similarly, when considering stores by sales volume, the relationships may vary by product as seasonal sales of $100,000–$150,000 may be "large" for shoe accessories, but "small" for dresses.

Unfortunately, as the number of products, stores, and time frames increases, the options for grouping data likewise increases. If the planner is going to be able to group data in an effective manner, the planner requires some mechanism for easily building groupings during an interactive planning session (i.e., dynamically). Without a dynamic system for providing hierarchical views of data, planning systems lack the robustness required by modem day business planners. The prior art provides no mechanism for allowing a planner to create such views dynamically.

SUMMARY OF THE INVENTION

The present invention addresses the above-mentioned problems by providing a system and method for dynamically building hierarchical groupings of business information based on multidimensional member characteristics. The system includes a computer program that comprises: (1) a mechanism for choosing one or more characteristic orders (i.e., a hierarchical model), a characteristic set made up of N characteristics, and an initial set of members; (2) a mechanism for assigning characteristic values for each of the N characteristics for each of the initial set of members; (3) a mechanism for dynamically creating hierarchical levels and level to level relationships based on the chosen characteristic order(s); and (4) a mechanism for dynamically creating new members and member to member relationships in each of the hierarchical levels.

Within the system, each of the level to level relationships includes a parent level and a child level, wherein the child level includes M characteristics and the parent level includes a subset of the M characteristics. New members can be created in the parent level by grouping (or clustering) together members in the child level that share the same characteristic values for each of the subset of the M characteristics. The clustering process is facilitated by having a consistent naming convention for both members and levels.

Accordingly, to create a first level of members based on the set of initial members, the system comprises a mechanism for grouping together initial members and their characteristic values into distinct clusters, such that each distinct cluster comprises a set of initial members having the same N characteristic values. Each distinct cluster then becomes a first level member.

The method comprises the steps of: (1) choosing a characteristic order, a characteristic set made up of N characteristics, and an initial set of members; (2) assigning characteristic values for each of the N characteristics for each of the initial set of members; (3) dynamically creating hierarchical levels and level to level relationships based on the chosen characteristic order; and (4) dynamically creating new members and member to member relationships in each of the hierarchical levels.

BRIEF DESCRIPTION OF THE DRAWINGS

The preferred exemplary embodiment of the present invention will hereinafter be described in conjunction with the appended drawings, where like designations denote like elements, and.

DETAILED DESCRIPTION OF THE DRAWINGS

1. Overview of The Planning System and Software

Figure 1:
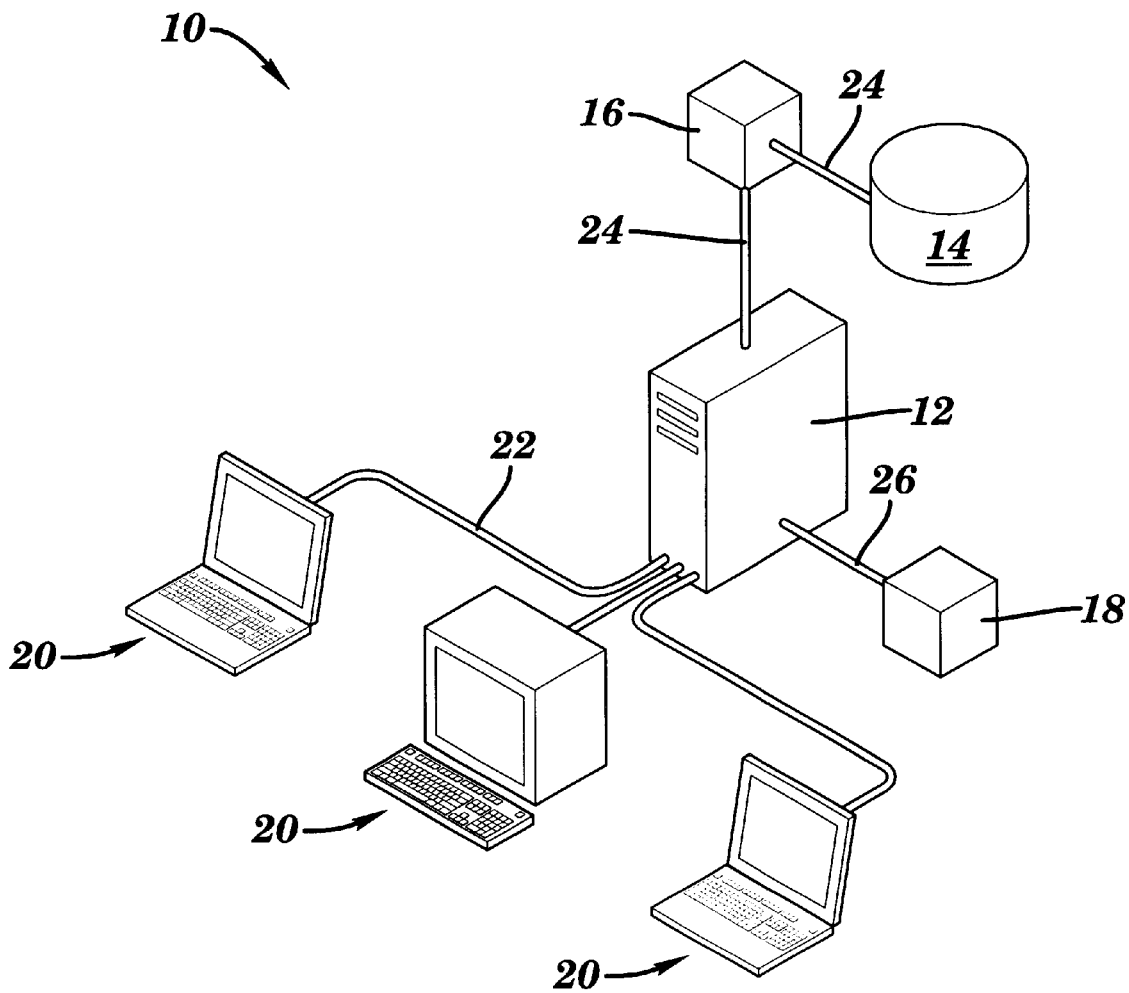
FIG. 1 depicts a planning system in accordance with a preferred embodiment of the invention.

Referring now to the figures, FIG. 1 depicts a computerized planning system 10. Planning system 10 comprises a planning engine server 12, a relational database 14, a data access engine 16, a plurality of client terminals 20, a planning data cube 18, and a plurality of communication links 22, 24 and 26. It should be recognized that although the system 10 is shown as a plurality of components, each or all of these components can reside within a single or distributed computer system. Client terminals 20 provide the user with an interface to access planning data and engage in a planning session. Planning data is stored in relational database 14, and is accessed by planning engine server 12 via data access engine 16 and communication link 24. Planning software, which is used to analyze and manipulate planning data, may reside on planning engine server 12 as well as client terminals 20. Planning data cube 18 comprises a subset of planning data that is utilized in a present planning session. It should be understood that each of the communication links 22, 24 and 26 may be implemented in any known manner, such as via a coaxial cable, phone wires, optical cable, wireless transmission, etc. Accordingly, each of the components may or may not reside in the same physical location.

The planning system 10 is generally described herein in terms of a merchandise planning system. However, it should be recognized that this invention covers any type of planning system, including inventory management, parts requirements, financial planning, etc. In addition, it is understood that one skilled in the art is familiar with planning software systems, such as Makoro™ sold by IBM Corporation.

Figure 2:
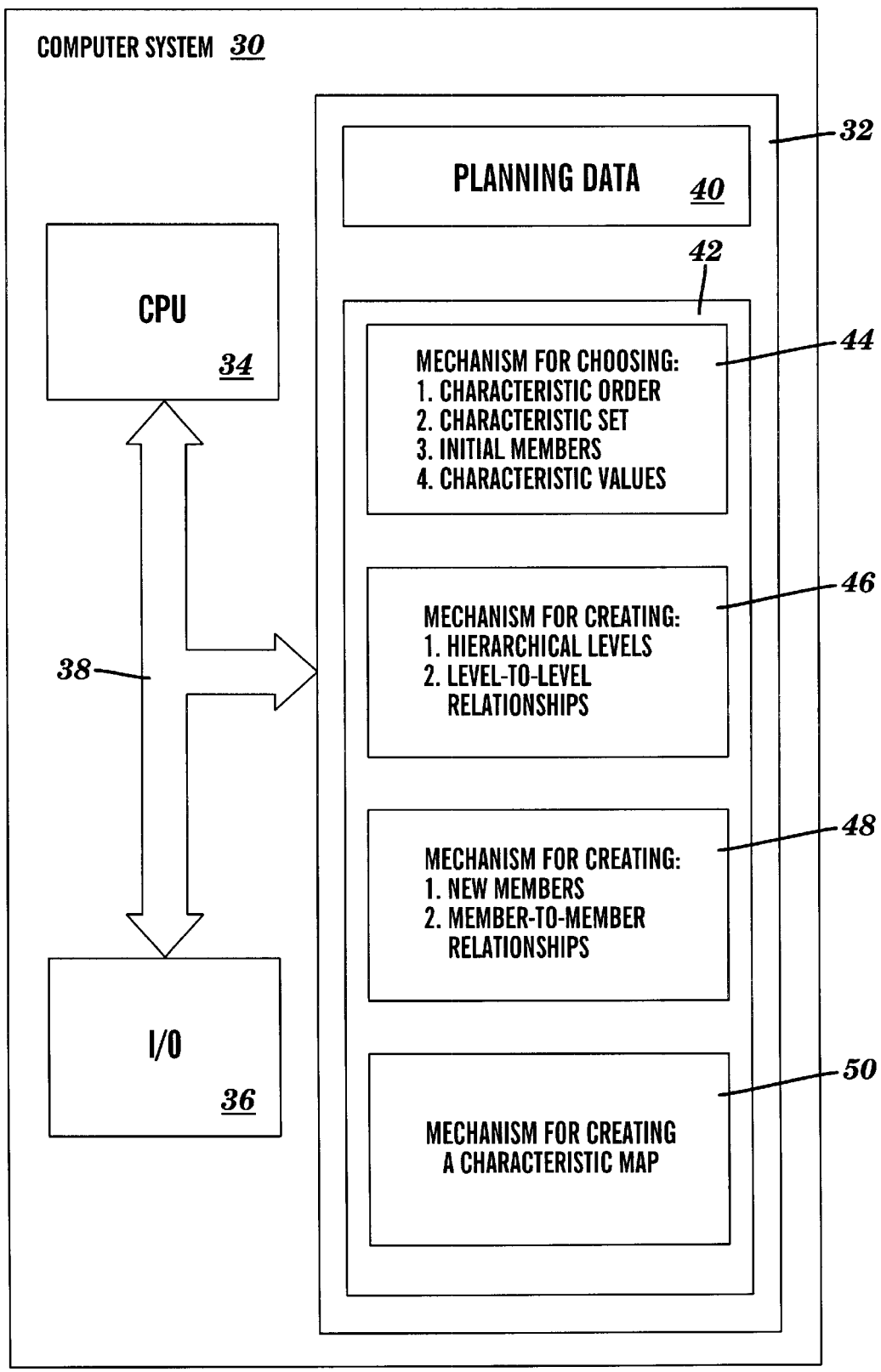
FIG. 2 depicts a computer system and program in accordance with a preferred embodiment of the invention.

Referring now to FIG. 2, a computer system 30 depicting an embodiment of the present invention is shown comprising memory 32, a central processing unit (CPU) 34, input output (I/O) 36, and bus 38. Memory 32 may comprise any known type of data storage and/or transmission media, including magnetic media, optical media, random access memory (RAM), read-only memory (ROM), a data object, etc. Moreover, memory 32 may reside at a single physical location, comprising one or more types of data storage, or be distributed across a plurality of physical systems in various forms. CPU 34 may likewise comprise a single processing unit, or be distributed across one or more processing units in one or more locations, e.g., on a client and server. I/O 36 may comprise any known type of input output device, including keyboard, mouse, voice, CRT, printer, disk drives, etc. Bus 38 provides a communication link between each of the components in the computer system 30 and likewise may comprise any known type of transmission link, including electrical, optical, radio, etc. In addition, although not shown, additional components, such as cache memory, communication systems, etc., may be incorporated into computer system 30.

It is understood that the present invention can be realized in hardware, software, or a combination of hardware and software. A planning system according to the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods. Computer program, software program, or planning software, in the present context mean any expression, in any language, code or notation, of a set of instructions intended to cause a system having an information processing capability to perform a particular function either directly or after either or both of the following: (a) conversion to another language, code or notation; (b) reproduction in a different material form.

Memory 32 comprises planning data 40 and planning software 42. Planning data 40 contains all of the data required for a planning session. Planning data 40 may comprise any type of data necessary for a business to plan for future requirements. For example, planning data 40 may comprise projected sales figures, inventory requirements, and financial information for a chain of retail clothing stores for an upcoming year. Planning data 40 may be stored in a relational database such as those sold under the trade names of DB/2™ or Oracle™, where it can be read by planning software 42.

Planning data 40 can originate from a variety of sources. Regardless of the source, in order to allow a planner to effectively view data, a consistent naming convention should be utilized both for data members and the various levels at which data may be viewed. Thus, while the specific names are not important, a consistent naming convention is important in order to ensure that the planner can view data from a variety of sources and across time frames, e.g., from one season to another. Thus, if store climates are classified as hot, moderate, or cold in one source of planning data 40, another should not refer to store climates as hot, warm, cool and cold. Similarly, if one data source defines levels as stores, markets and regions, all sources should conform.

Planning software 42 comprises various mechanisms for grouping data together in a hierarchical format based upon inputs or selections made by users. Specifically, the software 42 includes a mechanism 44 for choosing, selecting or inputting: (1) one or more characteristic orders, (2) a characteristic set made up of N characteristics, (3) an initial set of members, and (4) characteristic values for each of the N characteristics for each of the initial set of members. The one or more characteristic orders define a hierarchical model desired by the planner. The characteristic set is a defined set of attributes that can be used throughout the hierarchy to describe members. The characteristic values are the values assigned to the initial members. Each of these are described in more detail below.

Planning software 42 also comprises a mechanism 46 for dynamically creating hierarchical levels and level to level relationships based on the chosen characteristic order; a mechanism 48 for dynamically creating new members and member to member relationships in each of the hierarchical levels; and a mechanism 50 for creating a characteristic map. The systems and methods for implementing these features, as well as the significance of these features, are likewise described below.

2. Overview of Dimensional Modeling

Figure 3:
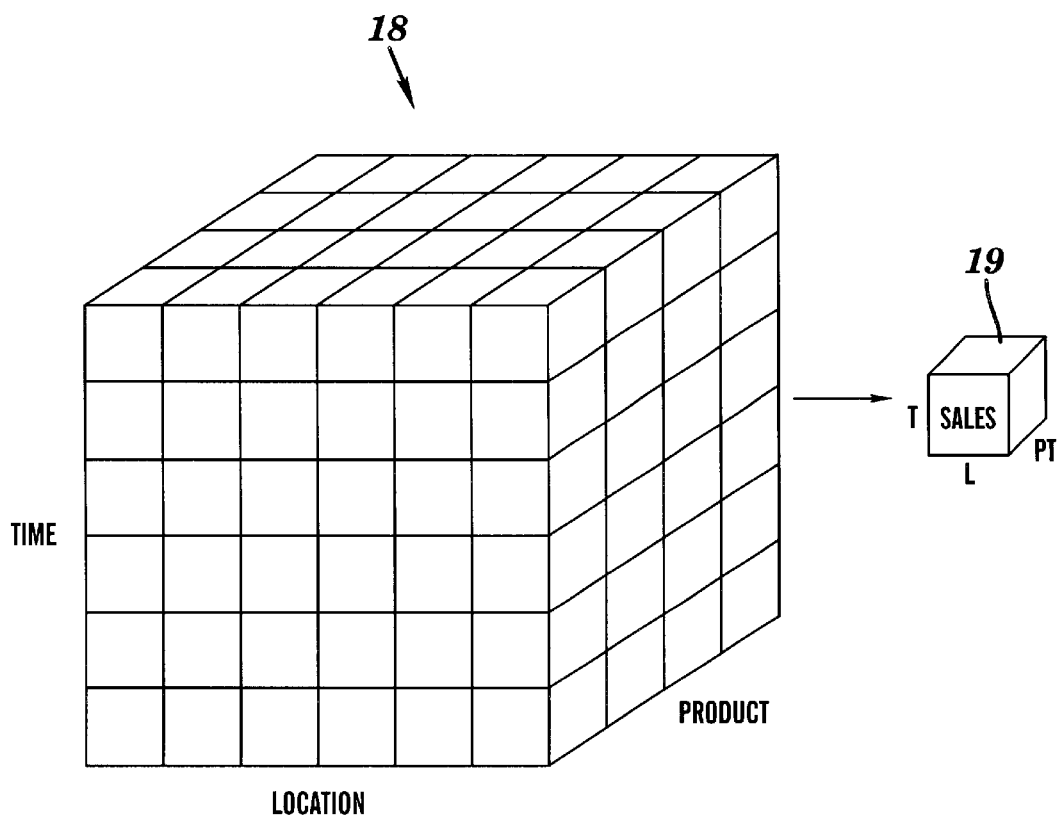
FIG. 3 depicts a multidimensional view of a business in accordance with a preferred embodiment of the invention.

Referring to FIG. 3, dimensional modeling provides a mechanism for visualizing data in a multidimensional cube 18. When data is presented as a multidimensional cube 18, users can "slice" the cube along any of its dimensions and view data within that context. Business data is viewed within the context of such a cube 18. Cube 18 has axes labeled product, location, and time, which provide a dimensional view of a business. A point inside the cube is at the intersection of coordinates defined on the dimensional axes. Each intersection point contains measurements of the business. At each intersection of product, location, and time, the cube 18 maintains a value for a relevant business measurement, for example sales 19. While this embodiment describes data in three dimensions, it is understood that the scope of this invention is not limited as such and any number of dimensions with any designations could be utilized.

Dimensional modeling entails maintaining business information (e.g., sales) and dimensional structures (e.g., product, location, time) for viewing business information. Business information is numerical measurements of the business data. Dimensions are independent, business specific abstractions that provide a mechanism for partitioning and subsequently viewing business information. Such information resides in a hierarchical manner within a dimension. The hierarchical views allow a user to view facts at an arbitrary, but predetermined granularity.

Members are "things" of a given "type," wherein each type is referred to as a "level." Members in a level share a common business semantic for the purposes of hierarchical decomposition of a dimension. In a product dimension, a business might have levels such as divisions (e.g., Ladies, Mens, etc.), classes (e.g., party dresses), styles, style-colors and SKUs (Stock Keeping Units). Each of these levels has a number of members. Thus, a particular type of black boot, size 10 is a member (i.e., an SKU), and the "Ladies' division" is also a member. Members and levels are related together by parent child relationships, e.g., the company (parent) has several divisions (children), each division has several departments, each department has several classes, etc. Levels in a location dimension may include regions, districts and stores. Levels in a time dimension might be years, seasons, months, weeks, and days.

Figures 4A, 4B:
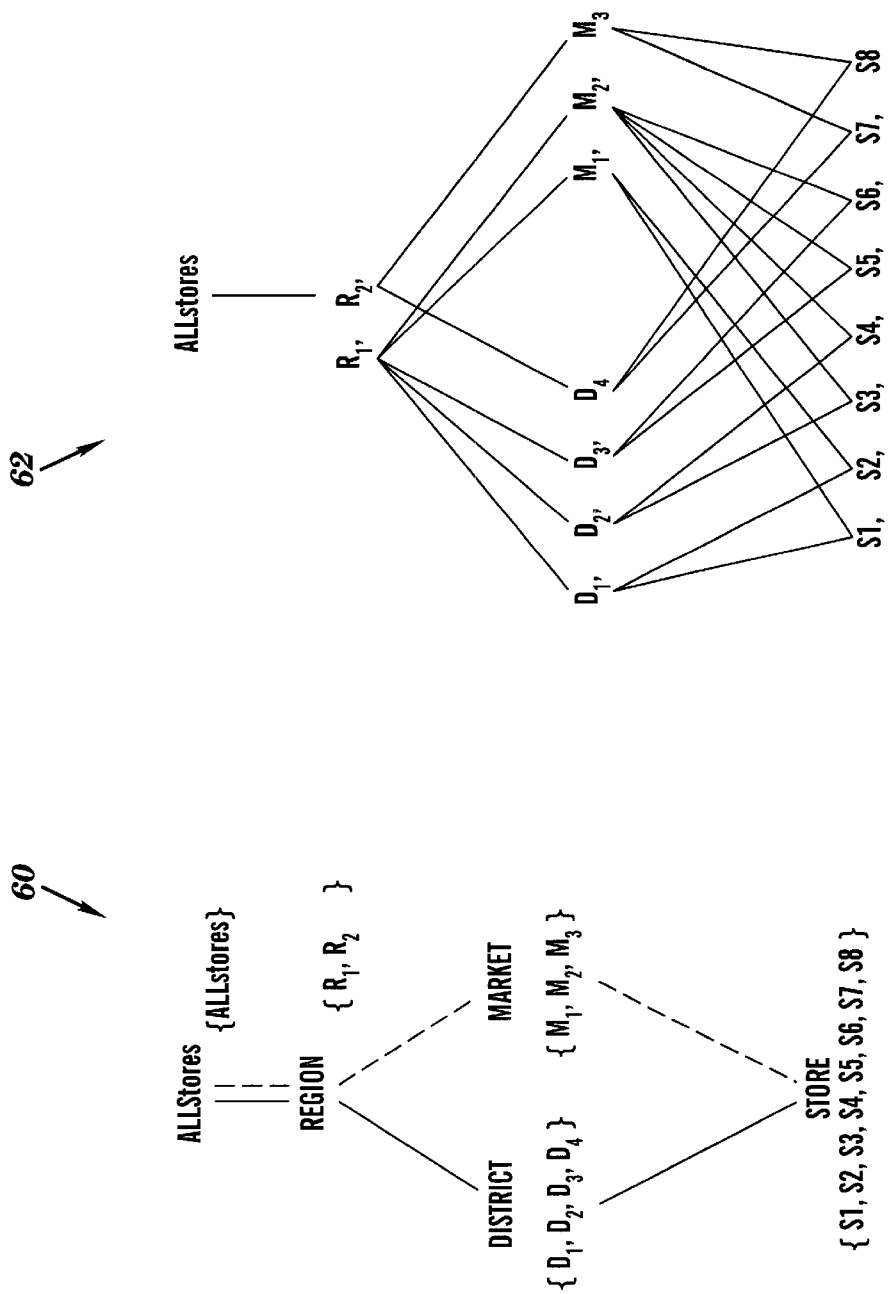
FIG. 4a depicts an exemplary hierarchical level to level view of a location dimension.
FIG. 4b depicts an exemplary hierarchical member to member view of a location dimension.

A dimension may contain multiple hierarchies, each of which provides a different business view of the underlying facts. The levels in a dimension logically provide an axis of a multidimensional cube, while the members in a level provide the coordinates of that axis. The hierarchical view within a dimension is maintained by parent-child relationships. A hierarchy, or hierarchical view, is a path through a series of parent-child relationships of levels that extend from a top level to a bottom level. This concept is illustrated in FIGS. 4a and 4b for a sample location dimension. It is understood however, that while this embodiment utilizes hierarchies to facilitate the description of the invention, the scope of the invention covers all structures that utilize parent-child relationships between levels.

FIGS. 4a and 4b illustrate a hierarchical decomposition of a location dimension. FIG. 4a illustrates a "level" view 60 of the hierarchy, where each member in a level is displayed in brackets. The bottom level comprises members made up of individual stores, while the other levels comprise members that include districts, markets, and regions. As can be seen, FIG. 4a depicts two hierarchies represented by two different paths shown as solid and dashed lines. FIG. 4b illustrates the member-to-member relationships 62 within the dimension. For example, stores S7 and S8 fall within market M3. The level-to-level and member-to-member relationships ultimately define how facts are consolidated or scaled within a dimension in order to provide views of a desired granularity.

Members are uniquely identified and further described by attributes or characteristics. Typical attributes for an SKU are description, color, size, price, supplier, etc. Attributes for a store might include size, fashion category, and climate. Attributes are discrete and static descriptors of members. Attributes are frequently used as constraints for viewing data in a multidimensional analysis. Thus, for example, members may have values for multidimensional attributes that provide characteristics of a product, a store, a market segment, a demographic, etc. For example, a member may be described by a product type (e.g., shoes) in a given fashion category (e.g., fashion forward or fashion following).

The hierarchical structures capture the manner in which business facts are analyzed, and are the foundation for a multidimensional analysis of a business. They are generally static over a period of time so that a business-maintains a consistent view of its data for analysis. This static hierarchical view is prevalent in standard data mining applications where an analysis tool allows a business to view historical data. That is, historical business facts are considered fixed and are subsequently analyzed.

Planning applications provide a different perspective to multidimensional analysis. In a broad sense, planning tools provide multidimensional analysis capabilities for planning the future of a business. The emphasis in planning is to provide a multidimensional analysis where business facts may be altered, and the effect assessed. These result in a "what if" approach to multidimensional analysis. The same hierarchical views within dimensions provide a framework for this multidimensional analysis. It is however, at times advantageous to have a flexible and dynamic way to construct hierarchical views within a dimension.

A typical example is the grouping of stores to facilitate the task of store planning by reducing the volume of locations to be planned. Stores may be grouped by some combination of attributes and facts, also referred to as "characteristics." The grouped stores are treated as a single entity for planning purposes. If stores are grouped and a hierarchical relationship is established based on the characteristics used in the grouping, the hierarchical relationships can be exploited by a multidimensional planning tool. The first step therefore is to establish a satisfactory set of groupings. Hierarchical relationships built on these groupings then facilitate planning. As described in this invention, the process of grouping and hierarchical relationship generation can be a dynamic process. Characteristic values may be manipulated and resulting hierarchies are assessed until a desirable goal is achieved.

The invention comprises an object representation (described in detail below with regard to FIG. 6) that supports the dynamic creation of hierarchical level and member relationships within a dimension based on member characteristics. The invention effectively supports a "what if" approach to hierarchy construction by supporting the dynamic creation of hierarchical relationships within a dimension. The advantage of using the invention is that hierarchical relationships can be determined in an interactive session. The resulting relationships can then be used in multidimensional planning.

3. Hierarchical Relationships

The invention allows dynamic grouping by providing an object-oriented view (i.e., a pattern) of the hierarchical relationships that comprise a business. The objects in the pattern and their interactions provide a framework for the dynamic creation of hierarchical relationships based on member characteristics.

Figure 5:
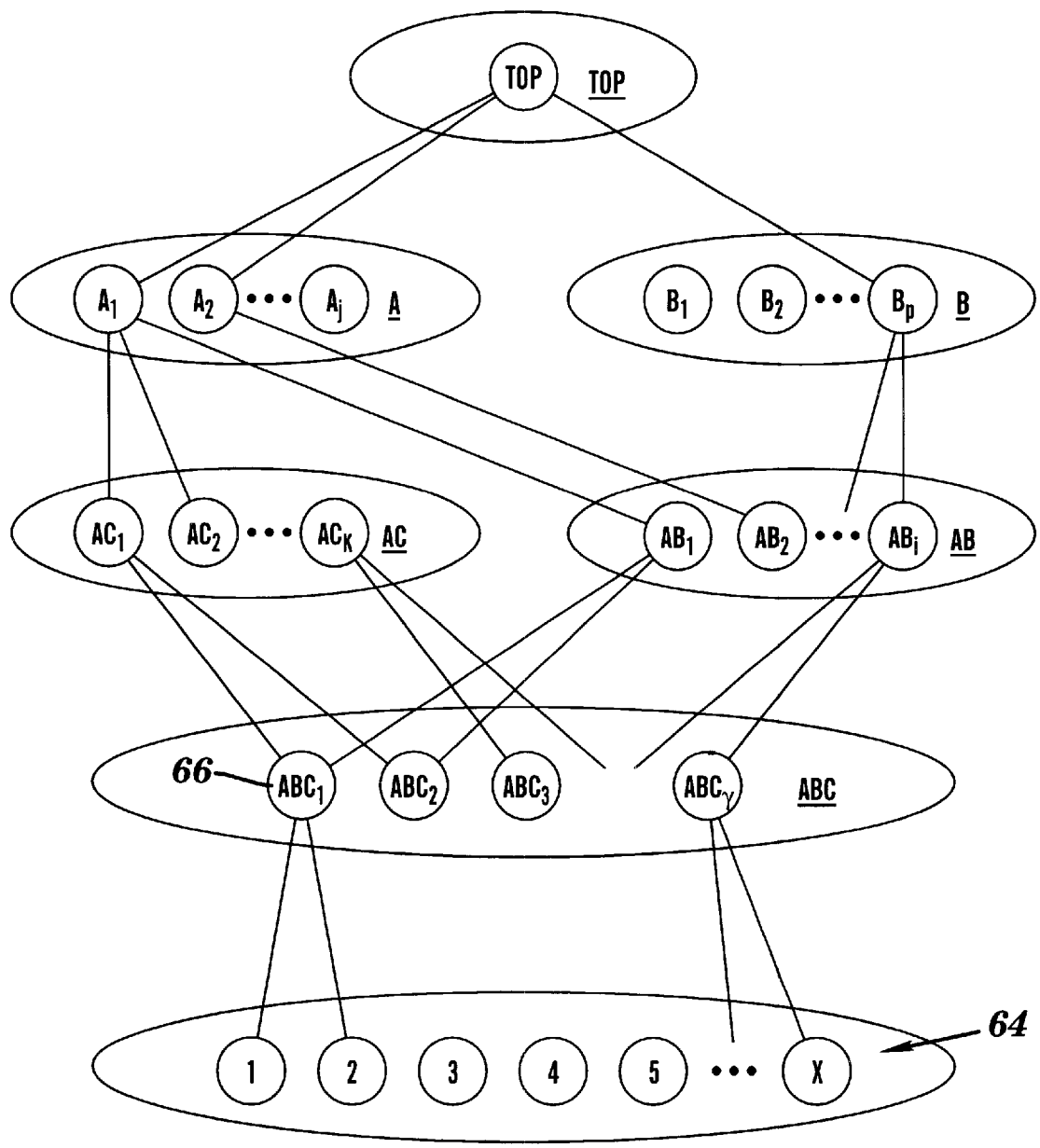
FIG. 5 depicts an exemplary characteristic driven hierarchical structure.

FIG. 5 illustrates the concept. A candidate set of initial members 64 from a dimension is selected. These are indicated by the circles numbered 1 through X contained in the ellipse at the bottom of FIG. 5. Each of these initial members 64 can take on values for characteristics A, B, and C (e.g., A=store size, B=store climate, and C=fashion category). Once members 1 through X are assigned characteristic values, a hierarchical view of the members can be generated. Consider the specific set of members with characteristic values:

A:a1,B:b1,C:c1, where uppercase letters denote a characteristic, and lowercase letters denote a value of the corresponding uppercase characteristic (e.g., a1=large, b1=hot, and c1=fashion forward). From a hierarchical perspective, a single parent member in the first level ABC may represent these initial (child) members, e.g., ABC1 66. (Note that while the initial members also reside at a "level," for the purposes of this discussion the ABC level is referred to as the first level.) There potentially exists such a first level member for each combination of member characteristic values. FIG. 5 partially illustrates the full set of possible member-to-member relationships in the first level ABC. In aggregate, the members that logically reside in the first level ABC represent parents of the initial set of initial members 64. Note that all members in level ABC must have values for each of the characteristics A, B, and C. Moreover, if multiple initial members have the same characteristic values for A, B and C, those initial members will be grouped, or clustered, together into a singe member at the ABC level. Thus, if there are N characteristics associated with the first level, each first level member will comprise a set of initial members that have the same N characteristic values.

The members of level ABC can be similarly refined. For example, all members in level ABC with the values:

A:a1,B:b2, can be grouped into a distinct parent cluster (i.e., member) AB1, which resides in a parent level AB. All combinations of values for characteristics A and B, which exist in level ABC, imply a distinct parent cluster in level AB. Similarly, the members in level ABC can be refined by the values of characteristics A and C. These parent members reside in a second level AC. This hierarchical refinement continues until a single member exists. This single member, at the uppermost level of the hierarchical structure, represents all original members. Thus, each of the level to level relationships includes a parent level and a child level, wherein the child level includes M characteristics (e.g., A and B) and the parent level includes a subset of the M characteristics (e.g., A).

Note that the arrangement of the characteristics is irrelevant to the hierarchical decomposition. Specifically, the member AB1 may represent all (ABC level) members with the characteristic values A: a1, B: b2. It also represents the (ABC level) members with values B: b2, A: a1.

The parent-child relationships between members in a level and the parent-child relationships between levels are mutually constraining. The order in which the objects are created is ultimately an implementation issue that is driven by the business requirements of an application. A hierarchy may be defined as an ordered set of levels, where each adjacent pair of levels has a parent-child relationship. For example, the ordered set of levels

{ABC, AC, A, TOP} form a hierarchy.

Given a set of N characteristics, the number of possible hierarchies is equal to the number of permutations of the characteristics. That is, N characteristics imply the existence of N factorial (i.e., N!) possible hierarchies. A hierarchy may be fully specified by the ordering of the characteristics, as illustrated in Table 1 below for the above example. Note that FIG. 5 actually represents the hierarchies ABC, ACB, and BAC.

TABLE 1

Characteristic ordering and associated hierarchies.

| Characteristic Order | Hierarchy |
|---|---|
| ABC | {ABC, AB, A, TOP} |
| ACB | {ABC, AC, A, TOP} |
| BAC | {ABC, AB, B, TOP} |
| BCA | {ABC, BC, B, TOP} |
| CAB | {ABC, AC, C, TOP} |
| CBA | {ABC, BC, C, TOP} |

It is therefore recognized that: (1) hierarchies (level parent-child relationships) can be fully specified by a characteristic ordering; and (2) given a set of characteristics, and members with corresponding characteristic values, hierarchical member-to-member relationships can be derived. These facts are used to generate level-to-level and member-to-member relationships within a dimension.

While the above discussion describes grouping members by building one or more hierarchies based upon inputting one or more specified characteristic orders in a one-to-one fashion, it should be recognized that the term "characteristic order" should be interpreted broadly as any representation that tells the system how to group members. Thus, for example, the entire hierarchical model shown in FIG. 8 as a graphical representation could be used as input.

4. Object Representation

Figure 6:
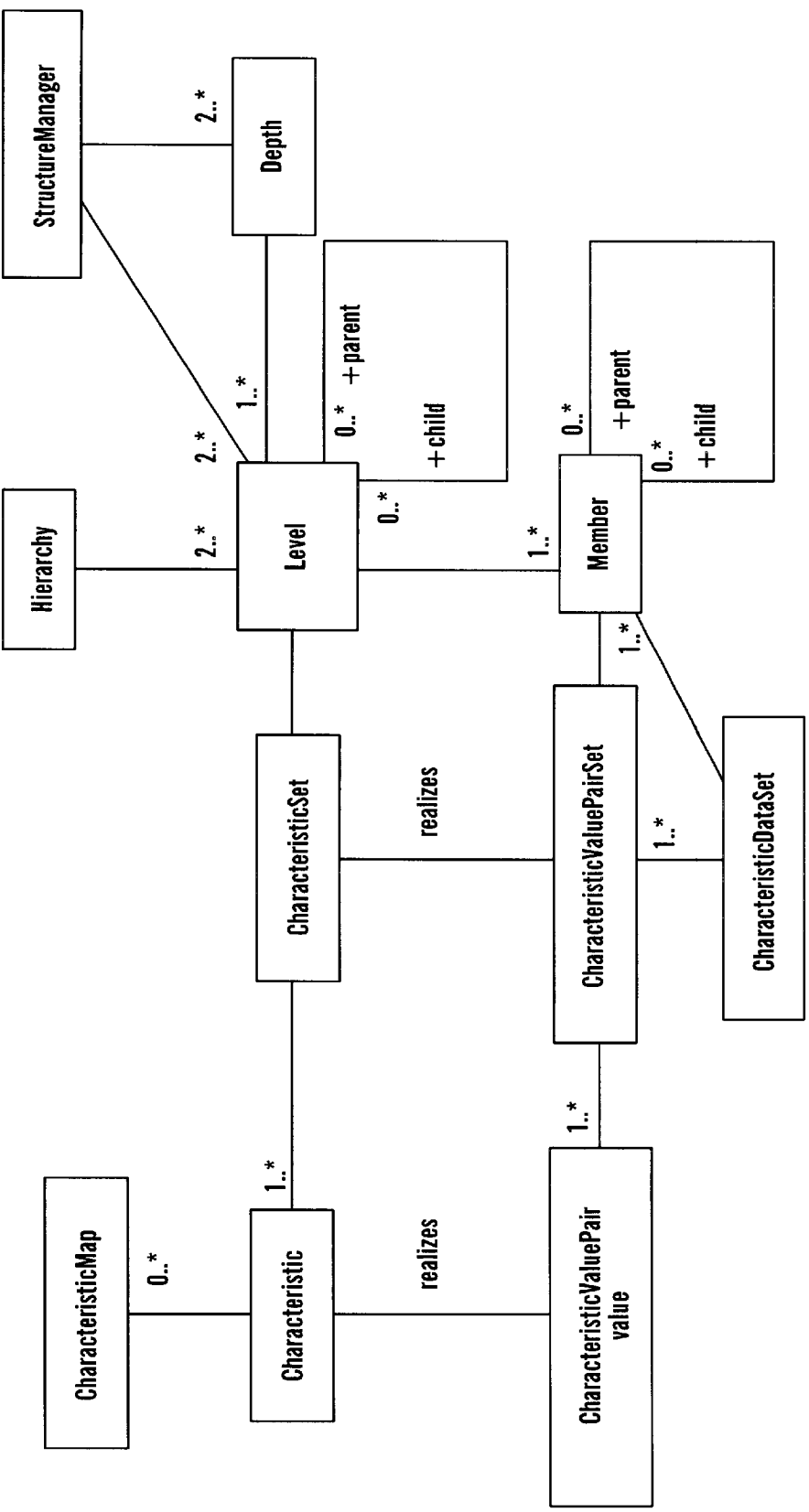
FIG. 6 depicts an object-oriented structure in accordance with a preferred embodiment of the invention.

Referring now to FIG. 6, an object model is depicted that provides an exemplary embodiment for implementing the invention. It is understood that the naming conventions and structures described below are exemplary in nature and that invention should not be limited as such. Other naming conventions and programming models could be utilized to realize this invention. A description of each object and its role within this embodiment are subsequently discussed. The objects illustrated in FIG. 6 can be classified as "structural" or "characteristic" related. Structural objects maintain the hierarchical relationships between elements of a dimension. Characteristic objects maintain information concerning characteristics and their values. The following sections define the illustrated objects.

a. Structural Objects Definitions

Level: This class represents a level in a dimension. A level contains members.

Member: This class represents a member of a dimension. In aggregate, levels, members, and their parent-child relationships establish the hierarchical structure within a dimension. The parent-child relationships between levels and members are constrained. A member may have multiple parents, but only a single parent in a specified level.

Hierarchy: This class is an ordered collection of levels. A hierarchy is a level-to-level path in a dimension.

Structure Manager: This class is the representation of the multiple sets of combined member-to-member and level-to-level relationships within a dimension. The hierarchical structure within a dimension is comprised of relationships between several structural objects (Member, Level, and Hierarchy). The business meaning of these relationships is outside the scope of any one object. The class Structure Manager provides this scope and provides the business meaning dimensional structure. In short, this class manages the structure illustrated in FIGS. 4 and 5.

Depth: This class is a collection of levels, each of which have the same number of ancestor levels in the hierarchical structure of a dimension. This class is a utility class used by the Structure Manager to maintain relative level orderings. It is not central to the hierarchical structure of a dimension. It is used to facilitate a traversal through the levels in a dimension. It will be discussed below.

b. Characteristic Objects Definitions

Characteristic: This class is the representation of a member characteristic.

Characteristic Map: This class is a mapping of characteristic values. It is used to map a continuum of values to a discreet set. For example, the fact sales can be a real number. For purposes of grouping by characteristic, these values are banded into discreet values.

Characteristic Set: This class is a set of Characteristics.

Characteristic Value Pair: This class maintains the characteristic and an associated value.

Characteristic Value Pair Set: This class is a collection of Characteristic Value Pairs.

Characteristic Data Set: This class maintains a collection of Characteristic Value Pair Sets for a collection of Members. That data in this set ultimately drives the dynamic creation of the hierarchical structure in a dimension.

c. Dynamic Interactions

The objects in FIG. 6 collaborate to perform the task of generating a hierarchical structure in a dimension based on characteristics. The basic process is to first establish the characteristic orderings and characteristic values. This information then drives the creation of level-to-level and member-to-member relationships. The next section provides the details of this process.

5. Establishing Characteristic Data

As noted above, N characteristics imply the existence of N! possible hierarchies. The factorial growth of the number of hierarchies must be managed. A user is usually interested in a subset of the N! possibilities. Instead of generating all N! hierarchies, it is assumed that a desired subset is specified before the full hierarchical structures are generated within a dimension. The desired hierarchies may be specified by an end user with a set of characteristic orderings (i.e., a hierarchical model), in any format.

The steps involved in establishing the characteristic data include: (1) specifying N characteristics and desired characteristic orderings (i.e., hierarchical model); (2) establishing a set of initial members; (3) establishing characteristic values for each of the initial members (the characteristic values associated with a member are maintained as a Characteristic Value Pair Set (CVPS)); (4) establishing Characteristic Maps as required (described below); and (5) aggregating the information into a Characteristic Data Set.

Establishing, selecting or choosing characteristic values can be done in any manner. For example, values can be entered in manually, read in from a database, calculated or manipulated from other data, etc.

Figures 7, 8:
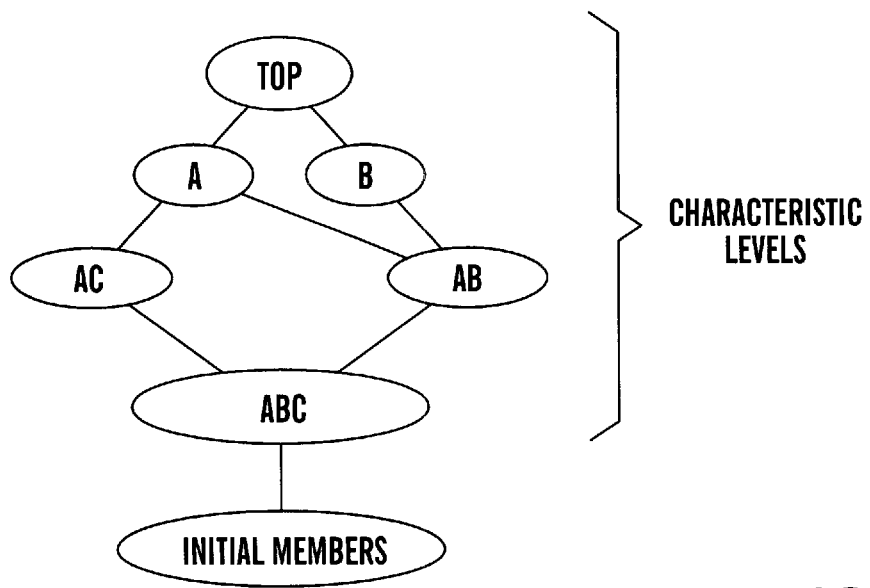
FIG. 7 depicts an exemplary Characteristic Data Set.
FIG. 8 depicts an exemplary level to level relationships for the structure depicted in FIG. 5.

Referring now to FIG. 7, a Characteristic Data Set with a Characteristic Map is shown. (This is the data provided by the Characteristic Value Pair Sets.) A planner can interact with the Characteristic Data Set, which provides the characteristic values as the cross product of the Characteristic Set and the member set. Thus, the user can modify values as needed during the planning process to, for example, create what-if scenarios.

FIG. 7 assumes that N Characteristics A, B, and C have been specified. Characteristic C has a continuum of possible values. A corresponding Characteristic Map is established to map the continuum to the discreet set {x, y}. For grouping purposes, the Characteristic Map is applied before the members are grouped. In this example, member M1 is associated with three Characteristic Value Pairs that make up the Characteristic Value Pair Set:

{ (A, a), (B, hot), (C, y) }.

After the characteristic values are suitably defined, chosen, or otherwise selected, the hierarchical relationships can be generated. The following section details the creation of the hierarchical structures.

6. Creating Hierarchical Structures

Characteristic orderings determine a sequence of levels, that is, a hierarchy. A set of hierarchies implies level-to-level relationships. Each level has an implied associated Characteristic Set. The Characteristic Value Pair Sets associated with the chosen members, which appear in the Characteristic Data Set, are the foundation for creating the member-to-member relationships. The Structure Manager coordinates the activities of establishing the structural relationships based on the characteristic information. Details for an implementation are provided below.

FIG. 8 illustrates the complete set of level-to-level relationships resulting from the characteristic orderings ABC, ACB, and BAC. These are the same orderings represented in FIG. 5. Refer to Table 1 above for the corresponding hierarchies. It is important to note that the hierarchies implied by the characteristic orderings ABC and BAC both share the level with Characteristic Set AB.

It may be useful to distinguish between the levels illustrated in FIG. 8. The ellipse labeled "Initial Members" ultimately contains the specified set of members to be grouped. All other levels and their members are dynamically created after the characteristic values are established for the initial members. The higher levels (ABC, AB, AC, A, B, TOP) in FIG. 8 may be referred to as "characteristic levels," since the chosen characteristics and their values at the designated initial members determine them.

The member-to-member relationships are then added to complete the hierarchical structure. First, the set of distinct Characteristic Value Pair Sets is derived from the Characteristic Data Set. For each distinct Characteristic Value Pair Set, a member is created in the level ABC. The parent-child-relationship is established between the ABC level and the initial members. From this point on, the remaining members can be derived as described above.

There are many options for algorithms that generate both the level-to-level and the corresponding member-to-member relationships. Details for one implementation of this pattern are provided below.

7. Algorithm

An exemplary algorithm is described in the context of a "Store Clustering" application. Store Clustering is the process of grouping (or clustering) stores to facilitate store planning by reducing the volume of locations to plan. As described above, the clustered stores are treated as a single entity for planning purposes. Thus, for example, a planner could cluster all big, hot, high volume stores into a single entity. Hierarchical structures for accomplishing this are dynamically established and subsequently exploited in a multidimensional planning tool.

The implementation of the invention for the Store Clustering application is driven by the fact that a user dynamically analyzes and creates hierarchical structures based on member characteristics. The dynamic nature of the interaction requires a real time response from the implementation. As a result, a goal of the implementation is to calculate information on an as needed basis.

The first step in a clustering process is to choose the Characteristics, choose the orderings, and specify a set of members to cluster. The definition of Characteristics centers on defining how the values are retrieved within the context of its parent application. Likewise, the set of members to cluster is specified within the context of the parent application. The characteristic orderings are used to create level sequences, which are maintained in a hierarchy. During the creation of the hierarchies, an analysis is performed to ensure proper level sharing. This information is the foundation for the dynamic creation of hierarchical structures based on characteristics. This information is maintained in a "Cluster" object.

The act of defining suitable characteristic values and the resulting hierarchical structures is termed "clustering." A user initiates a clustering session by specifying a Cluster object and other application specific information that allows the creation of a Characteristic Data Set. A Characteristic Data Set is presented to the user much as it appears in FIG. 7 or in any other suitable formnat. The planner chooses desired characteristic values in whatever manner is appropriate. At any point, the user may query how many groupings (or clusters) the Characteristic Data Set represents. This query (logically) results in the creation of the first set of member-to-member relationships. These are the relationships between the clustered members and the first set of groupings based on their characteristic values. This is shown in FIG. 5 as the relationship between the set of initial members 64 and first characteristic level ABC. The number of clusters is the number of members in a parent level of such a relationship.

If the number of clusters is satisfactory, the system provides further mechanisms for analyzing hierarchical structures resulting from the current Characteristic Data Set. In short, a user may choose a particular hierarchy and see predefined numerical values consolidated up a hierarchy. These values have no influence on the clustering process other than to provide a mechanism to assess the suitability of the hierarchical structures. A user may forgo this analysis and save the hierarchical structures. In any event, at the user's request, the implementation dynamically builds the levels, members, and their relationships as illustrated in FIG. 5. The general algorithm is explained below, using the example described above. Namely, the example included three characteristics A, B, and C and the hierarchies determined by the orderings ABC, ACB, and BAC.

The first step is to create "Depths," which are the set of characteristic levels that share a common set of ancestors. This is shown below with the notation LXYZ to represent a level with an associated Characteristic Set $\{X,Y,Z\}$. The top level is a special case. It has no distinguishing Characteristic Set. That is, its associated Characteristic Set is the empty set. We denote this level by L. In the example, this results in the following levels at the following depths.

| Depth | Levels | Characteristic Level "n" |
| --- | --- | --- |
| 0 | L | — |
| 1 | LA, LB | 3 |
| 2 | LAB, LAC | 2 |
| 3 | LABC | 1 |

The number of Depths is equal to the number of characteristics plus one (N+1). This information is used to narrow the scope when subsequently searching for levels. A flat list of levels could be utilized and searched through when a level needs to be located. However, since depth required is known when searching, the levels are accordingly partitioned. The members contained in LABC are known from the Characteristic Data Set analysis. Likewise, all members eventually culminate in a top-level member, which are created with no relationships.

Next, the level-to-level relationships are established, as well as the members and their relationships. First note that all the hierarchies have the same number of characteristic levels, which is the number of characteristics (e.g., LA, LAB, LABC). This number is one less than the number of Depths maintained by the Structure Manager, since the Structure Manager maintains a "top" level. Assume the characteristic levels are ordered from top to bottom. To complete the structural relationships, the following algorithm is applied, where for example n=1 for LABC, n=2 for LAB, and n=3 for LA, and N is the number of characteristics.

```
For each hierarchy (or set of characteristic orderings)
    for level n = 1 to N - 1
        extract the Characteristic Set from the current level n and level n + 1;
        locate these levels at Depths N + 2 - n and N + 1 - n;
        determine if these levels have been linked to establish a level-to-level
    relationship;
        if not, link them;
        for the characteristics at level n + 1, determine the Characteristic Value Pair
    Sets recognized in level n;
```

```
            for each recognized Characteristic Value Pair Set
                create a member in level n + 1;
                establish its children in level n;
            end loop
        end loop
        establish the top-level parent for the current members created for level N
    end loop
```

This algorithm is tailored to allow the creation of the level and member relationships for a single hierarchy as well as a set of hierarchies. After a Characteristic Data Set is established, a user may choose to analyze any number of hierarchies before accepting or rejecting the results. The structural relationships are accordingly built on an as needed basis.

The foregoing description of the preferred embodiments of the invention have been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

We claim:

1. A program product having computer readable code stored on a recordable media for creating hierarchical groupings of members within a planning system based on a chosen characteristic order and based on a characteristic set made up of N characteristics, the program product comprising:
    a mechanism for assigning characteristic values for each of the N characteristics for each of a plurality of initial members;
    a mechanism for grouping together initial members and their characteristic values into distinct clusters, such that each cluster comprises a set of members having the same N characteristic values; and
    a mechanism for creating a first level and set of first level members, wherein each first level member comprises one of the distinct clusters.

2. The program product of claim 1, further comprising:
    a mechanism for generating an (n+1)th level above an nth level, wherein the (n+1)th level is associated with N-n characteristics;
    a mechanism for grouping together nth level members and their characteristic values into (n+1)th level clusters, such that each (n+1)th level cluster comprises a set of nth level members having the same N-n characteristic values; and
    a mechanism for creating a set of (n+1)th level members, wherein each (n+1)th level member comprises an nth level cluster.

3. The program product of claim 1, further comprising a characteristic data set object for storing the characteristic values for each of the N characteristics for each of the plurality of initial members.

4. The program product of claim 1, further comprising a mechanism for creating hierarchical levels based upon the chosen characteristic order, wherein each of the levels is associated with a subset of the N characteristics.

5. The program product of claim 1, further comprising a mechanism for creating a characteristic map, wherein the characteristic map comprises a mapping of characteristic values into discreet groupings of characteristic values.

6. A method for creating hierarchical groupings of members within a planning system, the method comprising the steps of:
    choosing a set of initial members;
    choosing a characteristic set having N characteristics;
    choosing a characteristic order that includes a desired set of characteristic levels and includes a first level that is associated with the N characteristics;
    choosing characteristic values for each of the N characteristics for each of the initial members;
    grouping together members and their characteristic values into clusters, such that each cluster comprises a set of members having the same N characteristic values; and
    creating a set of first level members, wherein each first level member comprises a cluster.

7. The method of claim 6, further comprising the steps of:
    generating a second level above the first level, wherein the second level is associated with N−1 characteristics of the characteristic set;
    grouping together first level members and their characteristic values into second level clusters, such that each second level cluster comprises a set of first level members having the same N−1 characteristic values; and
    creating a set of second level members, wherein each second level member comprises a second level cluster.

8. The method of claim 7, further comprising the steps of:
    generating an (n+1)th level above an nth level, wherein the (n+1)th level is associated with N-n characteristics of the characteristic set;
    grouping together nth level members and the characteristic values into (n+1)th level clusters, such that each (n+1)th level cluster comprises a set of nth level members having the same N-n characteristic values; and
    creating a set of (n+1)th level members, wherein each (n+1)th level member comprises an nth level cluster.

9. The method of claim 6, comprising the step of creating a characteristic map, wherein the characteristic map comprises a mapping of characteristic values into discreet groupings of characteristic values.

10. A planning system that dynamically generates hierarchical groupings, the planning system comprising:
    a processing unit;
    a computer system memory accessible to the processing unit; and
    a planning program stored on the computer system memory, wherein the planning program creates hierarchical groupings of members based on a chosen hierarchical model and based on a characteristic set made up of N characteristics, the planning program comprising:
        a mechanism for assigning characteristic values for each of the N characteristics for each of a plurality of initial members;

a mechanism for grouping together initial members and their characteristic values into distinct clusters, such that each cluster comprises a set of members having the same N characteristic values; and a mechanism for creating a first level and set of first level members, wherein each first level member comprises one of the distinct clusters.

11. The planning system of claim 10, further comprising:

a mechanism for generating an (n+1)th level above an nth level, wherein the (n+1)th level is associated with N-n characteristics;

a mechanism for grouping together nth level members and their characteristic values into (n+1)th level clusters, such that each (n+1)th level cluster comprises a set of nth level members having the same N-n characteristic values; and a mechanism for creating a set of (n+1)th level members, wherein each (n+1)th level member comprises an nth level cluster.

12. The planning system of claim 10, further comprising a characteristic data set object for storing the characteristic values for each of the N characteristics for each of the plurality of initial members.

13. The planning system of claim 10, further comprising a mechanism for creating hierarchical levels based upon the chosen hierarchical model, wherein each of the levels is associated with a subset of the N characteristics.

14. The planning system of claim 13, wherein the hierarchical levels and the N characteristics comprise a predefined naming convention.

15. The planning system of claim 10, further comprising a mechanism for creating a characteristic map, wherein the characteristic map comprises a mapping of characteristic values into discreet groupings of characteristic values.

16. A program product having computer readable code stored on a recordable media for creating hierarchical groupings of members within a planning system, the program product comprising:

a mechanism for choosing a hierarchical model, a characteristic set made up of N characteristics, at least one characteristic order comprising any possible ordering of the N characteristics, and an initial set of members;

a mechanism for assigning characteristic values for each of the N characteristics for each of the initial set of members;

a mechanism for dynamically creating hierarchical levels and level to level relationships based on the at least one characteristic order; and a mechanism for dynamically creating new members in each of the hierarchical levels.

17. The program product of claim 16, wherein each of the level to level relationships includes a parent level and a child level, wherein the child level includes M characteristics and the parent level includes a subset of the M characteristics.

18. The program product of claim 17, wherein the mechanism for dynamically creating new members in each of the hierarchical levels creates members in the parent level by grouping together members in the child level.

19. The program product of claim 18, wherein members in the child level that are grouped together share the same characteristic values for each of the subset of M characteristics.

20. The program product of claim 16, wherein the initial members and the characteristic values for each of the N characteristics of the initial members are stored in a character data set object.

21. A computer system for dynamically generating hierarchical groupings in a planning system, the computer system comprising:

a processing unit;

a computer system memory accessible to the processing unit; and a planning program stored on the computer system memory, wherein the planning program comprises:

a mechanism for choosing a characteristic order, a characteristic set made up of N characteristics, and an initial set of members, wherein the characteristic order comprises any possible ordering of the N characteristics;

a mechanism for assigning characteristic values for each of the N characteristics for each of the initial set of members;

a mechanism for creating hierarchical levels and level to level relationships based on the chosen characteristic order; and a mechanism for dynamically creating new members in each of the hierarchical levels.

22. The computer system of claim 21, wherein each of the level to level relationships includes a parent level and a child level, wherein the child level includes M characteristics and the parent level includes a subset of the M characteristics.

23. The computer system of claim 22, wherein the mechanism for dynamically creating new members in each of the hierarchical levels creates members in the parent level by grouping together members in the child level.

24. The computer system of claim 23, wherein members in the child level that are grouped together share the same characteristic values for each of the subset of M characteristics.

25. The computer system of claim 24, wherein the initial members and the characteristic values for each of the N characteristics of the initial members are stored in a character data set object.

26. A method for dynamically creating hierarchical groupings of members within a planning system, the method comprising the steps of:

choosing a hierarchical model, a characteristic set made up of N characteristics, and an initial set of members, wherein the hierarchical model comprises at least one of the possible orderings of the N characteristics;

assigning characteristic values for each of the N characteristics for each of the initial set of members;

dynamically creating hierarchical levels and level to level relationships based on the hierarchical model; and dynamically creating new members in each of the hierarchical levels.

27. The method of claim 26, wherein the step of creating level to level relationships includes the step of creating a parent level and a child level, wherein the child level includes M characteristics and the parent level includes a subset of the M characteristics.

28. The method of claim 27, wherein the step of dynamically creating new members in each of the hierarchical levels creates members in the parent level by grouping together members in the child level.

29. The method of claim 28, wherein the step of grouping together members in the child level groups together members that share the same characteristic values for each of the subset of M characteristics.

30. The method of claim 29, further comprising the step of storing the initial members and the characteristic values for each of the N characteristics of the initial members in a character data set object.

31. A program product having computer readable code stored on a recordable media for creating hierarchical groupings of members within a planning system, the program product having an object-oriented structure for managing the hierarchical groupings, and comprising:

a member class for representing a member;

a level class for storing members at a predefined level;

a hierarchy class for storing an ordered set of levels;

a structure manager for storing relationships between the member class, level class and hierarchy class; and a characteristic data set class that maintains a collection of members and a set of characteristic values associated with each of the members in the collection of members.

32. The program product of claim 31, further comprising a characteristic map class, the characteristic map for mapping a continuum of characteristic values to a discreet set.

33. The program product of claim 31, further comprising:

a mechanism for choosing a characteristic order, a characteristic set made up of N characteristics, and an initial set of members;

a mechanism for assigning characteristic values for each of the N characteristics for each of the initial set of members and for storing the characteristic values in a characteristic data set;

a mechanism for dynamically creating hierarchical levels and level to level relationships based on the chosen characteristic order; and a mechanism for dynamically creating new members in each of the hierarchical levels.

* * * * *

UNITED STATES PATENT AND TRADEMARK OFFICE
CERTIFICATE OF CORRECTION

PATENT NO.    : 6,510,420 B1
DATED         : January 21, 2003
INVENTOR(S)   : Cessna et al.

It is certified that error appears in the above-identified patent and that said Letters Patent is hereby corrected as shown below:

Column 13,
Line 31, delete "characteristic order" and insert -- hierarchy --;
Line 32, after "comprising:", insert -- a mechanism for choosing a hierarchy comprising any possible ordering of the N characteristics; --;

Column 14,
Line 17, delete "characteristic order" and insert -- hierarchy --;
Line 18, after "levels", insert -- defining any possible ordering of the N characteristics --;
Line 60, after "program", insert -- dynamically --;
Line 63, after "characteristics,", insert -- wherein the hierarchical model includes at least on hierarchy comprising any possible ordering of the N characteristics, --;

Column 15,
Line 41, after "characteristics,", insert -- wherein the hierarchical model includes --;
Line 42, delete "characteristic order" and insert -- hierarchy --;
Line 48, after "the", delete "at least one characteristic order" and insert -- chosen hierarchical model --;

Column 16,
Line 9, delete "characteristic order" and insert -- hierarchy --;
Line 10, after "characteristics,", insert -- wherein the hierarchy comprises any possible ordering of the N characteristics, --;
Line 11, after "members", delete ", wherin the characteristic order comprises any possible ordering of the N characteristics";
Line 18, after "chosen", delete "characteristic order" and insert -- hierarchy --;
Line 42, after "characteristics,", insert -- wherein the hierarchical model includes at least one hierarchy comprising any possible ordering of the N characteristics, --;

UNITED STATES PATENT AND TRADEMARK OFFICE
CERTIFICATE OF CORRECTION

PATENT NO. : 6,510,420 B1
DATED : January 21, 2003
INVENTOR(S) : Cessna et al.

It is certified that error appears in the above-identified patent and that said Letters Patent is hereby corrected as shown below:

<u>Column 17,</u>
Line 6, after "member" second occurrence, insert -- , wherein the member has N characteristics --;
Line 8, after "storing", insert -- a hierarchy represented by --;
Line 8, after "levels", insert --, wherein the hierarchy comprises any possible ordering of the N characteristics --.

Signed and Sealed this

Seventeenth Day of August, 2004

JON W. DUDAS
*Acting Director of the United States Patent and Trademark Office*